United States Patent
Mackley et al.

(10) Patent No.: US 8,641,946 B2
(45) Date of Patent: Feb. 4, 2014

(54) EXTRUDATE HAVING CAPILLARY CHANNELS

(75) Inventors: Malcolm R. Mackley, Cambridge (GB); Bart Hallmark, Grundisburgh (GB)

(73) Assignee: Cambridge Enterprise Limited (GB)

( * ) Notice: Subject to any disclaimer, the term of this patent is extended or adjusted under 35 U.S.C. 154(b) by 975 days.

(21) Appl. No.: 10/582,465

(22) PCT Filed: Dec. 10, 2004

(86) PCT No.: PCT/GB2004/005196
§ 371 (c)(1), (2), (4) Date: May 3, 2007

(87) PCT Pub. No.: WO2005/056272
PCT Pub. Date: Jun. 23, 2005

(65) Prior Publication Data
US 2009/0011182 A1    Jan. 8, 2009

(30) Foreign Application Priority Data
Dec. 12, 2003 (GB) .................................. 0328855.2

(51) Int. Cl.
| B29C 47/12 | (2006.01) |
| B29C 47/08 | (2006.01) |
| B29C 47/92 | (2006.01) |
| B29C 47/20 | (2006.01) |

(52) U.S. Cl.
USPC .................. 264/177.16; 267/40.3; 267/167; 267/172.1; 267/173.17; 267/177.1; 267/177.14; 267/177.15; 267/177.16; 267/209.1; 267/209.8; 267/210.1; 267/504; 267/514; 267/515; 267/560; 267/565; 267/572; 425/72.1; 425/131.1; 425/133.5; 977/888

(58) Field of Classification Search
None
See application file for complete search history.

(56) References Cited

U.S. PATENT DOCUMENTS

| 3,014,237 A | 12/1961 | Breen |
| 3,075,242 A | 1/1963 | Grafried |

(Continued)

FOREIGN PATENT DOCUMENTS

| DE | 2605481 | 2/1976 |
| DE | 3022313 | 12/1980 |

(Continued)

OTHER PUBLICATIONS

Oriented Structure Formation During Polymer Film Extrusion, S.L. Sakellarides & A.J. McHugh, Polymer Engineering and Science, Dec. 1985, vol. 25, No. 18, pp. 1179-1187.

(Continued)

Primary Examiner — Jeffrey Wollschlager
(74) Attorney, Agent, or Firm — Bourque and Associates, PA

(57) ABSTRACT

The invention provides apparatus for producing an extrudate product including a plurality of capillary channel. The apparatus comprises an extruder having an inlet, a die including an orifice having a predetermined outer shape and a plurality of needles each having a body including an internal conduit for fluid flow. Each needle further comprises an outlet from the internal conduit at an outlet end. The outlet end of each needle is arranged in a predetermined pattern substantially within the orifice of the die and the conduit of each needle is fluidly connected to a fluid source. In use extrudable material is fed into the extruder through the inlet. The extruder forces the extrudable material around the bodies of the needles towards the die and through the orifice in the die to produce an extrudate having substantially the predetermined outer shape. The needles allow fluid to be drawn from the fluid source through the conduit to be entrained in the extrudate product to form capillaries such that the extrudate product includes capillaries therealong in the predetermined pattern. Other aspects of the invention provide a method for producing an extrudate product including a plurality of capillary channels and an extrudate product having a plurality of capillary bores.

13 Claims, 4 Drawing Sheets

— 500 micron

(56) References Cited

U.S. PATENT DOCUMENTS

| | | | |
|---|---|---|---|
| 3,081,490 A | | 3/1963 | Heynen et al. |
| 3,121,254 A | | 2/1964 | Heynen et al. |
| 3,274,315 A | * | 9/1966 | Kawamura .................... 264/563 |
| 3,313,000 A | | 4/1967 | Hays |
| 3,372,920 A | * | 3/1968 | Corbett et al. ................ 264/508 |
| 3,397,427 A | | 8/1968 | Burke, Jr. et al. |
| 3,464,450 A | * | 9/1969 | Steffenini .................... 138/113 |
| 3,585,684 A | | 6/1971 | McIntosh et al. |
| 3,588,313 A | * | 6/1971 | Delves-Broughton .......... 174/28 |
| 3,758,354 A | * | 9/1973 | Sakurai et al. .................. 156/79 |
| 3,771,934 A | * | 11/1973 | Delves-Broughton ........ 425/135 |
| 3,778,495 A | * | 12/1973 | Wooley .................... 264/177.15 |
| 3,792,951 A | * | 2/1974 | Meyers ....................... 425/326.1 |
| 3,907,002 A | | 9/1975 | Gulich |
| 3,929,135 A | * | 12/1975 | Thompson ............... 604/385.08 |
| 3,929,951 A | * | 12/1975 | Shibata et al. ................ 264/566 |
| 4,002,709 A | | 1/1977 | Mozer |
| 4,061,821 A | | 12/1977 | Hayano et al. |
| 4,234,431 A | | 11/1980 | Mishiro et al. |
| 4,308,192 A | * | 12/1981 | Okada et al. ................. 264/40.3 |
| 4,381,912 A | | 5/1983 | Yamamoto et al. |
| 4,440,195 A | | 4/1984 | van Dongeren |
| 4,655,987 A | * | 4/1987 | Zertuche ...................... 264/563 |
| 4,707,393 A | * | 11/1987 | Vetter ........................... 428/178 |
| 4,834,635 A | * | 5/1989 | Groen ........................... 425/72.1 |
| 4,874,522 A | * | 10/1989 | Okamoto et al. ............. 210/645 |
| 5,046,936 A | | 9/1991 | Bourdiol et al. |
| 5,089,187 A | * | 2/1992 | Aptel et al. ...................... 264/41 |
| 5,094,793 A | | 3/1992 | Schrenk et al. |
| 5,171,493 A | * | 12/1992 | Aptel et al. ...................... 264/41 |
| 5,417,909 A | | 5/1995 | Michels |
| 5,427,316 A | | 6/1995 | Leone |
| 5,658,644 A | * | 8/1997 | Ho et al. ....................... 428/188 |
| 5,725,814 A | | 3/1998 | Harris |
| 6,162,318 A | * | 12/2000 | Planeta et al. ............ 156/244.27 |
| 6,637,213 B2 | | 10/2003 | Hutchison et al. |
| 6,787,216 B1 | * | 9/2004 | Koenhen ...................... 428/188 |
| 6,939,327 B2 | | 9/2005 | Hall et al. |
| 7,550,102 B2 | * | 6/2009 | Herrington .............. 264/171.29 |
| 2002/0174663 A1 | | 11/2002 | Hutchison et al. |
| 2003/0082257 A1 | | 5/2003 | Keller et al. |
| 2003/0212373 A1 | | 11/2003 | Hall et al. |

FOREIGN PATENT DOCUMENTS

| | | |
|---|---|---|
| DE | 9210057 | 9/1992 |
| DE | 1014302 | 3/2003 |
| EP | 0317192 | 5/1989 |
| FR | 2616812 | 12/1988 |
| GB | 1582104 | 12/1980 |
| GB | 2060811 | 5/1981 |
| GB | 2103144 | 2/1983 |
| JP | 1190192 | 4/1999 |
| WO | WO0102085 | * 1/2001 |
| WO | WO 03106137 | 12/2003 |

OTHER PUBLICATIONS

Holey fibers get liquid-crystal boost, Jacqueline Hewett, Oct. 30, 2003, fibers.org.
Photonic Crystal-Based Polymer Optical Fibers, PJ Brown & S. Foulger, FY2003 (Year 12) Continuing Project Proposal, National Textile Center, Project No. M02-CL06.
Fundamental process and system design issues in $CO_2$ vapor compression systems, Man-Hoe Kim, Jostein Pettersen & Clark W. Bullard, 30 (2004) 119-174, Progess in Energy and Combustion Science.
International Search Report, Sep. 5, 2005.
Written Opinion of International Searching Authority, Sep. 5, 2005.

* cited by examiner

EXTRUDATE HAVING CAPILLARY CHANNELS

CROSS-REFERENCE TO RELATED APPLICATIONS

The present invention relates to apparatus for creating an extrudate having a plurality of capillary channels therethrough; the invention also relates to a method of producing such an extrudate and to the extrudate itself.

BACKGROUND TO THE INVENTION

It is well known to form synthetic polymers into lengths of material by passing the polymer, whilst in the soft or molten state, through an orifice in a die. Such a process is known as extrusion moulding and can be applied to a wide range of materials, for example materials which may undergo a physical, chemical or crystallographic change from a fluid or malleable state to a solid state. Thus, the extrusion process can be applied to materials which undergo a chemical reaction to form a solid cured product; to materials which dry either by the evaporation of water therefrom or by the absorption of water into a different crystal or morphological form; or to molten or thermoplastic materials which solidify on cooling. The extrusion process is of especial application in the extrusion of thermoplastic polymers such as polyalkylene resins, notably polyethylenes, polypropylenes and alloys or blends thereof. For convenience, the invention will be described hereinafter in terms of the extrusion of a polymer and the term extrudate will be used herein to denote in general all materials which can exist in a viscous, malleable, fluid or semi-fluid form which can be extruded under pressure through the orifice of a die and the term malleable will be used herein to denote the physical state of such a material as it is extruded.

Typically, the material to be extruded is fed as a particulate solid to a cylindrical tube known as the barrel of the extrusion apparatus and is fed along the barrel by a rotating screw drive or auger, a reciprocating ram or other positive transport means. If necessary, the barrel can be heated or cooled to maintain the material within the barrel at an optimum temperature for flow of material through the barrel. The material is forced through an orifice at the end of the barrel, typically an interchangeable die made from a tool steel or other wear resistant material and having an orifice whose cross sectional geometry substantially corresponds to that of the shape which is to be produced. Typically, the cross section of the bore which forms the flow path of the extrudate downstream of the barrel progressively changes until it has the shape of the die orifice. Such change preferably occurs smoothly and the terminal portion of bore may have a cross section which is substantially uniform and corresponds to that of the orifice located at the downstream end of the bore. For convenience, the term die will be used hereinafter to denote that portion of the extrusion equipment through which the extrudate flows downstream of the barrel; the term bore of the die will be used to denote the passage within the die through which the extrudate flows; and the term die orifice will be used to denote the orifice through which the extrudate flows from the downstream end of the bore. The die can be formed as a unitary member with the bore and orifice being machined or otherwise formed in a single metal component. Alternatively, the die can be formed in sections so that only the terminal section or sections need be replaced to enable the shape of the die orifice and hence of the product to be changed.

The extrusion of synthetic fibres is well known in the textile industry where spinnerets are used to extrude fibres prior to the fibres being woven into textiles. Such fibres are typically substantially cylindrical, although substantially triangular fibres are also known. To increase the insulating properties of the fibres and to reduce the amount of material used to form the fibres it is known for spinnerets to produce fibres having one or more bores therealong.

Single bore fibres have been formed using gas entrainment within the extrudate as shown in U.S. Pat. No. 3,397,427. This document discloses the use of a single gas outlet within the die orifice, the gas outlet being positioned centrally within the die orifice.

Fibres with multiple bores are also known in the textile industry, but these have been produced through the use of bluff voids as described in EP 0 317 192 and in U.S. Pat. No. 3,585,684 in which several extruded elements are caused to coalesce soon after exiting the die orifice. Such dies must be very carefully designed for a specific extrudate composition and volumetric flow rate as die swell (the swelling of extrudate as it exits the die orifice) may cause the desired bores within the material to vary in size, close up or to become unstable.

It is an object of the present invention to produce an extrudate having a plurality of hollow bores and to address some of the issues above.

SUMMARY OF THE INVENTION

According to an aspect of the invention there is provided apparatus for producing an extrudate product, the extrudate product including a plurality of capillary channels therethrough, the apparatus comprising an extruder having an inlet, a die including an orifice having a predetermined outer shape, a plurality of needles each having a body including an internal conduit for fluid flow, each needle further comprising an outlet from the internal conduit at an outlet end, the outlet end of each needle being arranged in a predetermined pattern substantially within the orifice of the die, the conduit of each needle being fluidly connected to a fluid source, wherein, in use:

a) extrudable material is fed into the extruder through the inlet;

b) the extruder forces the extrudable material around the bodies of the needles towards the die and through the orifice in the die to produce an extrudate product having substantially the predetermined outer shape;

c) the needles allow fluid to be drawn from the fluid source through the conduit to be entrained in the extrudate product to form capillaries such that the extrudate product includes capillaries therealong in the predetermined pattern.

It has been found that the problem of die swell within the capillary is substantially reduced or negated when fluid is allowed to enter the capillary. This allows the bore of the capillaries to be more accurately controlled so small bore capillaries can be reliably produced. It is envisaged that capillaries having a bore of between about 2 mm to 10 microns may be produced in a single stage of melt processing. However, it is envisaged that a further processing stage could produce capillaries having a bore of below 1 micron. It should be understood that the capillary bores are also referred to as micro-capillaries.

It is preferred that the needle outlets are substantially regularly distributed in the die orifice as this helps to prevent maldistribution of the extrudate. It is preferred that each needle outlet is a substantially equal distance from other outlets and from the orifice of the die. For example, if the die orifice is substantially rectangular and the predetermined pattern of needle outlets is a simple line of outlets within the orifice it is preferred that the line is arranged substantially centrally in the short side of the rectangle and that the distances between the needle outlets are substantially identical to the distance between the outer needle outlets and the short edges of the orifice, and the line of outlets and the long edges of the orifice. The needle outlet may be any suitable size, but it is preferably between 2 mm and 0.1 mm and most preferably between 0.6 mm and 0.2 mm. For instance, with a needle outlet size of 0.3 mm capillary bores of between 200 microns and 20 microns can be readily produced depending on the processing conditions.

It is preferred that the pressure of the fluid entering the capillaries through the needles is substantially equal to the pressure of the environment into which the extrudate product is being extruded as it has been found that this produces a more stable extrudate product. It is preferred that the flow of extrudable material entrains the fluid in the capillary, but it should be understood that the fluid may enter the capillaries at above or below the pressure of the environment into which the extrudate product is being extruded, but that greater control may be needed. The fluid allowed to enter the capillaries will typically be air at room temperature and pressure, but the extrusion may be in a liquid bath or other non-typical environment. The fluid source may be air at room temperature and pressure if the extrudate product is being extruded into such an environment and can be drawn straight from the local atmosphere. However, it should be understood that the fluid source may be an inert gas or liquid, or a sample gas or liquid that is to be trapped within the capillaries in the extrudate product.

It is preferred that a gear pump is used to steady the flow of extrudable material between the extruder and the die. This helps to reduce any flow abnormalities that may result from variations in the operation of the extruder.

The die is used to take the feed of material from the extruder and change the shape of the material flow until it has the desired outer shape and can exit though the die orifice which has substantially the predetermined outer shape. It should be understood that, due to die swell, the outer shape of the extrudate may not correspond exactly with the predetermined shape of the orifice. It is preferred that the die is a converging die. The die is preferably shaped to ensure that the flow over the needles is substantially even as this helps to create a well formed, regular extrudate.

It is preferred that the die orifice is substantially rectangular so the resulting outer shape of the extrudate product is substantially rectangular. The dimensions of the rectangular orifice are preferably such that the extrudate product is a sheet or film. Preferably the rectangular orifice has a long side having a length that is at least 5 times longer than the short side. Preferably the ratio is greater than 10 as this may allow the film to flex more readily. It should be understood that the orifice could take any other suitable shape, including an annulus, square or circle. It has been noted that with a non-circular die, for instance a rectangular die there may be edge effects that alter the shape of the capillaries at or near an edge of the film. Such edge effect may be negated through the use of an annular die which is, in effect, a continuous film having no edges. An annular die may allow the production of an extrudate product have greater consistency in the size and shape of the capillaries.

For simplicity the apparatus will now be described with reference to the preferred embodiment in which the die has a substantially rectangular orifice in which an array of needle outlets are arranged in a line substantially parallel with the long side of the rectangle and substantially in the centre of the short sides of the orifice. This produces an extruded film having a plurality of capillaries therealong. It should be understood that different arrays and orifice shapes could be employed.

It is preferred that the needle outlets are substantially circular in shape. This shape of outlet is easy to form, but other shapes could be used if desired. It is also preferred that the body of each needle is substantially cylindrical and is elongate along a first axis. The bodies are preferably arranged such that the first axis of the cylindrical body is substantially parallel with the flow of material as this provides a low resistance to the material flow and is simple to manufacture.

It should be understood that the plurality of needles may be formed individually, integrally, or in groups of two or more needles. For example a solid monolith of metal could be used to form a plurality of needles. The monolith may include holes therethrough to form the needles required by the invention. The needles may include a common inlet which then divides into a plurality of conduits leading to a plurality of outlets. The outlets of the needles from the monolith may protrude from the monolith allowing the extrudate to flow around the protrusion before gas is drawn from the outlet, or there may be no protrusion. The extrudate will flow around the monolith and draw gas through the outlets as described above.

Although it has been mentioned above that die swell within the capillaries is substantially reduced or negated, die swell still occurs at the die exit. The outer shape of the extrudate product will swell as it exits the orifice. In the case of the film, it has been found that the swell is greater along the short axis of the rectangular orifice than along the long axis. The result is that the substantially circular capillaries within the extrudate prior to swelling are distorted into an elliptical shape with the long axis substantially parallel to the short axis of the rectangular cross section of the film. It should be understood that with variations in outlet shape and processing, the capillaries cross section can be varied.

The extrudate product is preferably drawn away from the orifice at a rate greater than the rate at which the product is produced. The draw ratio is the ratio of the rate of production of extrudate to the rate at which the extruded product is drawn off. At some draw ratios (between 16 and 20) it appears that the die swell effect dominates and the capillaries are substantially elliptical.

At higher draw ratios (above 30) the change in geometry due to the extrudate drawing dominates. As has been shown in the literature, during drawing of an extrudate having a rectangular cross section, the length of the short axis decreases at a faster rate than the length of the long axis of the extrudate and so the capillaries are distorted to form substantially elliptical capillaries that have their long axis substantially parallel to the long axis of the rectangular cross section. The drawing process typically reduces the overall cross sectional dimensions of the extrudate product and therefore reduces the dimensions of the capillaries within the product.

It has also been found that it may be possible to further process the extrudate product after drawing. This further processing can be either cold drawing or warm drawing at an elevated temperature. It has been found that cold drawing can reduce the product dimensions by between two and three times and a greater reduction is to be expected when warm drawing is used.

The apparatus and a process using the apparatus is capable of producing rectangular section extrudate product with multiple capillaries running along their length.

Presently, extrudates have been produced with elliptical multiple capillaries of major axis length roughly 65 µm and minor axis length of 35 µm. It should be noted that the aspect ratio and the mean diameter of the capillary can be varied through changes in the process conditions.

A roughly twenty meter length of extrudate was produced and sectioned five times at equal intervals along its length and the product viewed under the scanning electron microscope. This revealed that the capillaries changed their dimensions by no more than about 10% along their length.

With certain polymers, for example LLDPE, there is a good degree of optical transparency despite any crystalline content present within the polymer. Total, or at least a significantly increased level of, optical transparency could be achieved by using an amphorous polymer such as polystyrene. It is also possible that water soluble polymers could be used in this process.

According to the invention there is provided an extruded film, the film having a length and a substantially rectangular cross section perpendicular to said length, said cross section including two long sides and two short sides, the film includes a plurality of capillary bores substantially parallel to the length of the film.

Various applications have been suggested for the film extrudate product. These areas include 1. DNA Analysis—Capillary Electrophoresis Arvidsson et al. outlined in U.S. Pat. No. 6,322,682 a method for using plastic capillaries in place of fused silica tubing for the capillary electrophoresis of DNA. The main advantages that were found for polypropylene hollow fibres was their transparency to visible and near UV EM radiation along with reduced fragility.

The use of hydrophobically coated polymeric hollow fibres is outlined in the patent of around 120 cm in length with an internal bore of 65 µm. These dimensions are easily manufactured using apparatus as set out above.

A film-like micro-capillary extrudate can include an array of equispaced, parallel capillaries that could be used to run samples in parallel. The external surfaces of the film may be substantially flat as opposed to cylindrical in less refraction of incident EM radiation when analysing samples.

The internal channels may be elliptical with the major elliptical axis orientated in the direction of the width of the extrudate. This would again reduce the amount of refraction of incoming EM radiation allowing easier visualisation of capillary contents. A film may also provide an easier geometry to which to attach electrodes.

2. Heat Transfer Applications

If a blend of a thermoplastic (for example, polyethylene) along with a highly thermally conductive filler (for example, carbon black) was processed into the micro-capillary extrudate, it would allow for the manufacture of flat heat-exchange devices. The length scales across which these devices could be made would range from sub-millimeter devices to sheets tens of centimeters wide.

The application areas for this type of device could be very wide due to the ease with which a flat film could be bonded onto a source or sink of heat. For example the removal of heat from integrated circuits (ICs). Currently, most ICs rely on forced convection for cooling, usually in the form of a metal heat sink bonded to the device with a fan driving air over it. With increasing power dissipation from high-speed devices and the drive to intensify circuitry, Micro-capillary heat exchangers would allow for a less bulky and quieter way to dissipate heat. In place of a fan, there would be need for a (preferably electrically insulating) thermo fluid and a means of circulating this to an external heat transfer surface. A film of Micro-capillary bonded to the outside of a case could also fill this role.

The film product may also be suitable for applications that require heat to be exchanged from surfaces in space-critical applications where conventional heat exchange devices would be unsuitable due to space limitations. The flat and thin nature of the film may allow ease of adhesion onto a surface and near-negligible thermal inertia.

Any application that requires heat to be exchanged on surfaces that would not normally lend themselves to be heat exchange surfaces—for example as wallpaper may be suitable applications for the film product. The material is lightweight, robust and capable of withstanding the temperatures of a domestic heating system for winter use and also lowered temperatures of a cooling surface, or heat sink, for summer use.

An array of Micro-capillaries (either as one large film, or a laminate) could be used as a heat exchanger for medium-scale flow-rates, such as in the use of the warming of IV fluids prior to transfusion to a patient.

It has been found that it is possible to laminate two or more films together. For example, to laminate two LLDPE films together the films can be heated to 119° C. and pressed together with a force of 9.8N for 3 mins. If the temperature, time or force is too low then fusing of the films to form a laminate does not occur. If the temperature, time or force is too high then there will be fusing of the films, but it is likely that the capillary bores will collapse.

3. Fluid Transport Applications

The application areas around fluid transport are fairly extensive. For liquid use, the pressure drop along a length of extrudate would be significant and this could be taken advantage of in some applications. For fluid flow with low pressure-drops, the use of gases would be feasible.

It is envisaged that applications could be found for transporting fluid from one set of micro-fluidic equipment to another in a method analogous to that of ribbon cable within electronic equipment. The ability to be able to carry many fluid streams in parallel is an obvious space-saving advantage along with the ability to keep each stream at identical thermal conditions. The regularity of the capillary array in the flat film would also allow for the development of a connector analogous to the edge-connectors used on ribbon cable. An array of needle-like devices could puncture the tubing and a suitable compression clamp could then seal the ends to stop the escape of liquid.

The film extrudate made of a suitable material could be used as part of a peristaltic pump allowing very accurate pumping, and metering, of small quantities of fluid. The advantage that a flat extrudate would have over conventional hollow-fibres would be the ease of installation within the pump since flat Micro-capillary extrudate could be positioned easily, and reproducibly, within the pump and give a good contact surface with rotating parts. This would give the user the advantages of handling something relatively large (the multi-capillary extrudate as a whole) whilst retaining the advantages of having micro-scale tubing (the embedded capillaries within the extrudate)

The film product could also be used to form a device that could be used to 'drop-on-demand'. A length of film extrudate could be filled with a working liquid (ink, scent, drugs, reagents) that would be retained within the capillary due to the pressure needed to cause a flow and capillary forces. In other words, once a piece of Micro-capillary is filled with fluid, the fluid would not drain out of the capillary and the fluid would be subject to very little evaporation due to the small surface area of the channel presented to the outside world.

If a subsequent pressure pulse of the correct magnitude was then applied to the Micro-capillary, liquid could then be forced to flow out of the capillary drop by drop in a controlled manner.

The film extrudate could be used as the tubing within chromatography columns. One possible advantage is that a suitable stationary phase could be identified and either blended with the polymer when in pellet form or could be manufactured in-situ by using the process to entrain a reactive gas as opposed to air, thus forming a stationary phase. Either technique may be able to result in the production of a chromatography column with a stationary phase already in place.

The film product could be used effectively as pneumatic piping for small to medium scale robotics (amongst other applications). The use of a multi-channel film extrudate could allow pneumatic signals to be passed from an array of controllers to their respective actuators very efficiently much in the way that a ribbon cable allows electrical communication between constitutive parts of a circuit.

4. Micro-Reactor Applications

Film extrudate could be used in the fabrication of micro-reactors. Currently, one of the methods that this achieved is by the etching of glass wafers to produce an open channel. A covering plate is then bonded to on top of the etched plate to form a closed channel of known, micro-scale, dimensions. The film product could both be a way of reducing the cost of manufacturing micro-reactors and increasing their robustness.

The film product provides the ability to have an array of robust, parallel, flow channels regularly spaced next to one another.

The method of manufacture outlined above allows the creation of non-circular flow channels. A highly elongated ellipse is a possible flow geometry that, if the major axis were to be located along the width of the film, would have very little curvature on each of the longer sides. This would minimise refractive effects that may be encountered in circular hollow fibres when visually probing the nature of the sample contained within the capillary. Additionally, the ability to create flow channels in polymers as opposed to within glass may open the way for improved UV spectrometry since some polymers do not absorb these wavelengths.

The use of a reactive gas, as opposed to air, as the fluid source during the manufacture of the extrudate could produce a coating on the internal surface coating. It may be possible to produce a graded hydrophobic coating which could enhance the capillary action due to an imbalance of forces resulting from differing advancing and receding contact angles. It may also prove possible to form catalytic coatings in this manner.

If a highly filled polymer was used, for example polyethylene filled with alumina, extrudates could be formed with catalytic properties. These could be used either in such a way so that sufficient alumina is presented on the capillary surface with the polymer matrix still in place or it may be possible to form a capillary templated ceramic by burning the surrounding polymer matrix away and sintering the ceramic. Care would have to be taken to avoid the destruction of the product during this process.

5. Further Biomedical Applications

If a drug could be encapsulated within a porous section of the extrudate product and attached to an adhesive surface, it could be then placed on (or indeed, under) the skin to allow controlled transport of the drug into the body. The advantage of a film as opposed to a hollow fibre would be ease of application and the advantage of using a porous extrudate as opposed to more conventional means would be the ability to control the pore size and hence dosing rate.

An electrolyte could be placed into a length of Micro-capillary extrudate to allow the communication of electrical signals along it. In the same way as a ribbon cable allows many signals to pass along one cable, a section of extrudate product could execute a similar task in the absence of metallic compounds and with entirely bio-compatible materials. Having a flat 'ribbon' of extrudate as opposed to a hollow-fibre bundle would allow ease of connection of each capillary and its associated electrolyte.

It may be possible to use a porous film of extrudate product as a blood-gas exchange medium, or in other words to perform the function of biological capillaries. This could either be used as in implant, or more likely in the lab-growth of tissues.

6. Liquid Encapsulation Applications

The ability to be able to heat-seal, or weld, sections thermoplastic together may provide means of being able to form 'packets' of encapsulated fluids within a section of the extrudate product. The encapsulated liquid could be wide-ranging, but areas where extrudate products would be advantageous would be ones where the visibility of the encapsulated medium is of importance. One example would be to encapsulate a spectrum of temperature sensitive liquid crystals that would emit a specific wavelength of light which directly related to the temperature to produce a reliable, visible, liquid crystal thermometer. The flat surface would allow it to be easily bonded to other surfaces such as vessels, pipes, or even skin.

7. Optical Applications

The optically transparent nature of an extruded polymer could open the way for numerous applications including fluorescent strips. A fluorescent dye could be either encapsulated in, or used to coat the sides of, a sheet of film extrudate. This may provide an alternative route for providing reflective material.

An initially photosensitive fluid could be encapsulated into a discrete matrix of cells within a sheet of extrudate film (fill the capillaries and then heat-seal into small packets) and then selected cells of this fluid 'developed' by means of exposure to EM radiation (preferably radiation that is not abundant in nature—for example far UV) so that their colour changed with temperature and made the form of a hazard warning sign. This could then be mounted on a reflective backing material and be used as hazard warning signs to warn against, say, black ice.

Strips of Micro-capillary extrudate film could be filled with a high refractive-index fluid and then be used as a polymer-based optical fibre.

The films could also be used a UV, IR or optical fibre, or as a photonic crystal by selecting the polymer of the film such that signals can be transmitted along the film with the micro-capillaries guiding the signals.

8. Foodstuffs

The process used to create Micro-capillary extrudates within polymers could be transferred to any extrusion processable material, including foodstuffs. It could be envisaged that the introduction of Micro-capillaries into foodstuffs could create interesting new textures or even allow the infusion of flavour into very specific parts of the product.

9. Porous Matrix Applications

It is possible that the polymer matrix surrounding the Micro-capillaries can be manufactured to be porous. Currently, porous hollow fibres are used as membranes and can be produced with the absence of blowing agents. This is achieved through successive hot and cold stretches in semi-crystalline polymers. It may also be possible to use a blowing agent in the melt to produce a porous product. The final product may have an open-cell, porous structure.

Currently, ultra filtration techniques are achieved by the use of bundles of porous hollow fibres. Application areas for this technology are currently widespread and include reverse osmosis seawater desalination and filtration of wastewater. There may be applications however, where a filter bundle would be geometrically unsuitable and a flat sheet of porous Micro-capillaries may have applications in its place, for example an ultra filtration vessel lining.

Porous hollow fibres may be used in the creation of dialysis units. If multi-channel Micro-capillary extrudates were used it may be possible to construct more compact units and also to reduce their pressure drop by the use of parallel capillaries.

BRIEF DESCRIPTION OF THE DRAWINGS

The invention will now be further described, by way of example, with reference to the accompanying drawings, in which.

DETAILED DESCRIPTION

Figure 1:
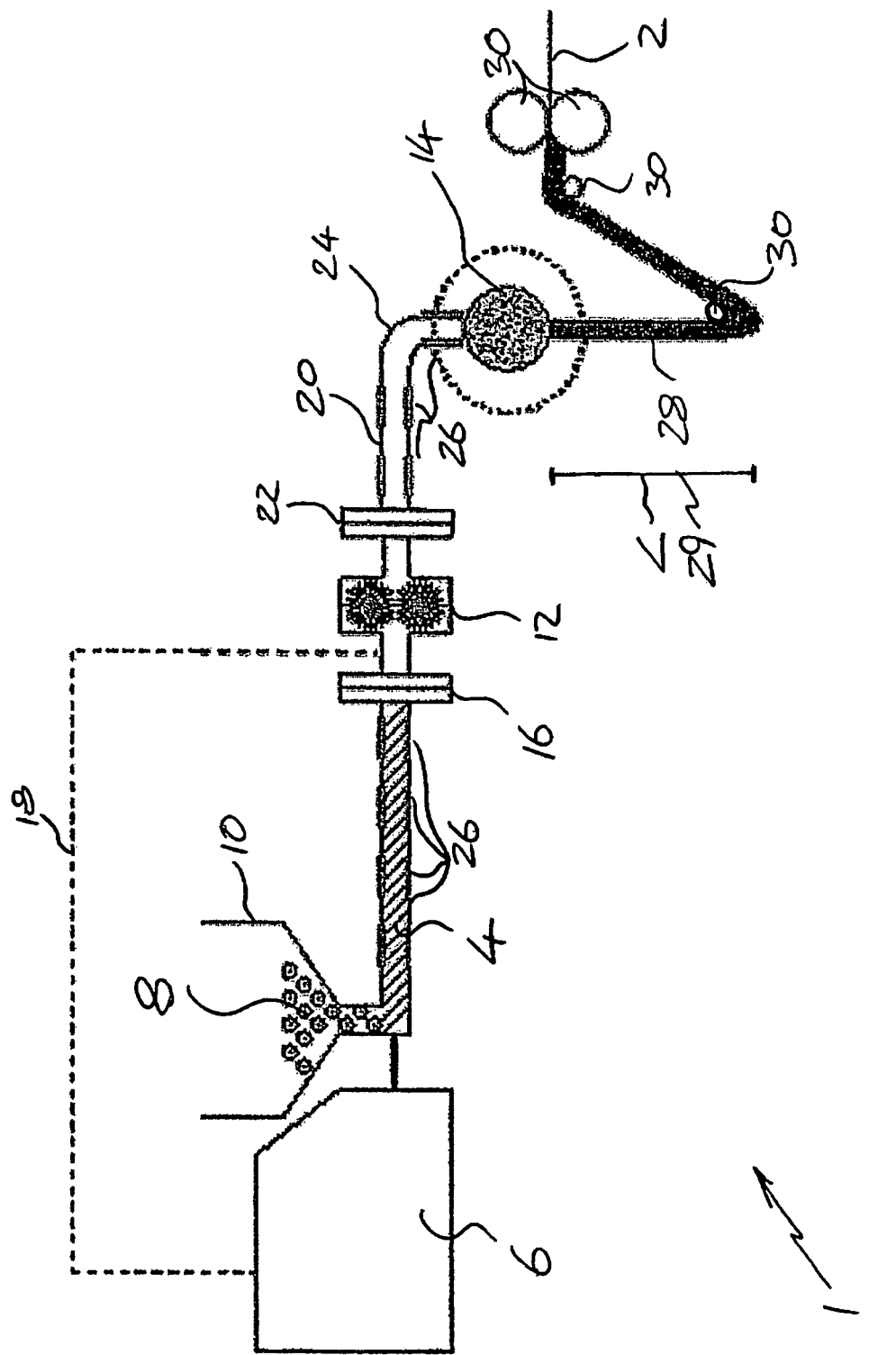
FIG. 1 is a schematic diagram of an extrusion apparatus according to an embodiment of the invention.

FIG. 1 shows extrusion apparatus 1 for creating an extrudate product 2 having capillary bores therealong. The extrusion apparatus comprises screw extruder 4 driven by a motor 6. Extrudable material 8 is fed to the extruder screw 4 through a hopper 10. As the extrudable material passes through the extruder screw 4 the material is melted to form a melt (not shown). The extruder screw 4 feeds the melt to a gear pump 12 which maintains a substantially constant flow of melt towards a die 14. The gear pump 12 is connected to the extruder screw 4 by a flange 16 which includes a screen filter to remove impurities from the melt flow. The motor 6 is controlled using a pressure feedback link 18 between the inlet of the gear pump and the motor 6.

The melt passes to the die 14 through an extruder barrel 20 which is connected to the gear pump by a flange 22. In this embodiment the extruder barrel includes a 90° bend 24. Band heaters 26 are used to control the temperature at different stages in the extrusion apparatus 1. Band heaters 26 may be located within the extruder, on the flanges 16,22, on the gear pump 12, on the extruder barrel 20 and also on the die 14.

The detail of the arrangement of the die 14 will be shown in greater detail in subsequent figures.

The melt passes through the die 14 and is formed into the desired shape and cross section. As the melt passes out of the die it becomes an extrudate 28. The extrudate 28 is drawn down over and between rollers 30. The drawing down process, as described above, alters the cross section of the extrudate 28 to form the extrudate product 2. A draw length (L) 29 is defined between the orifice and the first roller 30. It has been found that L has a great effect on the extrudate product 2 formed by this apparatus.

Figure 2:
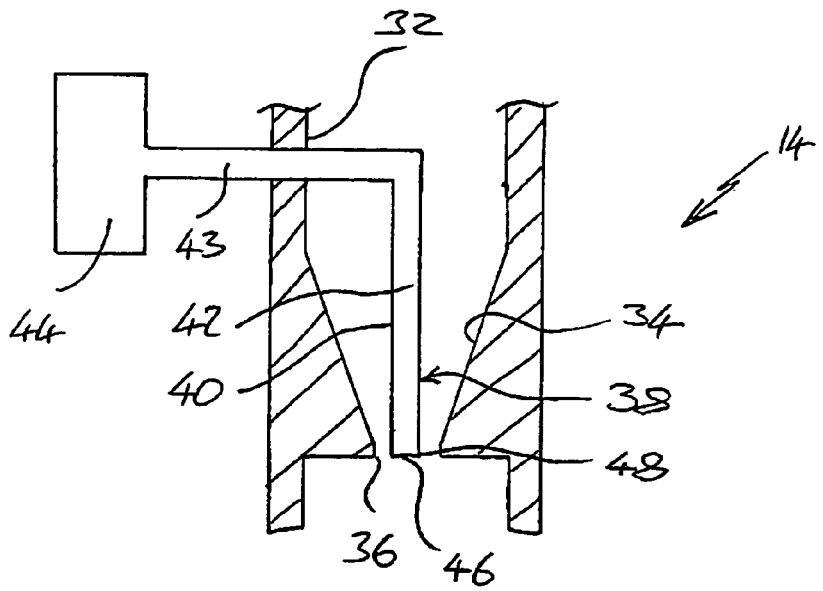
FIG. 2 is a schematic cross section through the die of FIG. 1.

FIG. 2 shows a schematic cross section through the die 14 of FIG. 1. The die includes an entry portion 32, a convergent portion 34 and an orifice 36 which has a predetermined outer shape. The melt enters the entry portion 32 of the die 14, is gradually shaped by the convergent portion 34 until the melt exits the orifice 36.

The die 14 further includes needles 38 (only one of which is shown in this figure) positioned therein. The needle 38 a body portion 40 having a conduit 42 therein which is fluidly connected to a fluid source 44 by means of a second conduit 43 passing through a wall of the die 14 around which the melt must flow to pass to the orifice 36. The needle 38 further includes an outlet 46 at an end 48 of the needle 38. The needle 38 is arranged such that the outlet 46 is located within the orifice 36.

Figure 3:
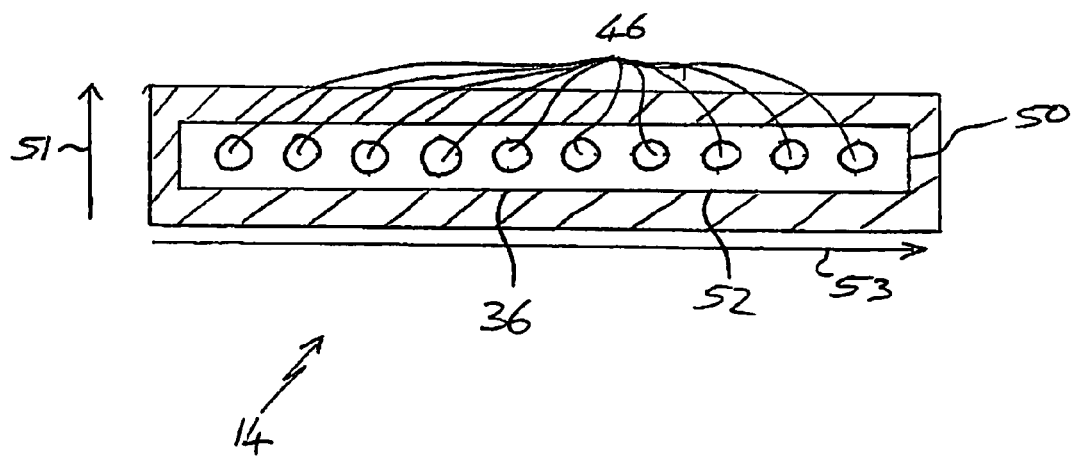
FIG. 3 is a schematic view of the die of FIG. 1 from below.

FIG. 3 shows a schematic view of the die 14 from below. This diagram shows that the orifice 36 has a rectangular outer shape. The orifice has a short side 50 substantially parallel with a short axis 51 and a long side 52 substantially parallel with a long axis 53.

In this example, the die includes ten needles 38 with the outlets 46 distributed substantially evenly along the long axis 53 within the orifice and substantially centrally in orifice along the short axis 51. In this example, the die orifice has a short side dimension of 1.5 mm, a long side dimension of 18 mm and the needles have a 0.5 mm outer diameter and a 0.3 mm inner bore (needle outlet).

Description of an Exemplary Process

A polymer melt is produced in a screw extruder 4 and its resultant flow rate stabilised by means of a gear pump 12. This melt is then fed into a die 14 in the orifice of which is arranged a plurality of outlets from needles 38 in a predetermined pattern. A conduit 42 through each needle 38 is fed from a horizontally orientated feed conduit 43, the entrance of which is open to atmosphere outside of the die which is the fluid source 44. The resulting extrudate is then passed over a series of rollers 30 into a haul-off device (not shown). The speed of the haul-off device can be altered so that extrudate products 2 with differing draw ratios can be produced.

The die 14 is designed such that the incoming flow from the extruder, which is contained in a circular pipe, is altered such that it may pass through the orifice 36 of the die 14. The die 14 must effect this geometry change, and this is currently achieved by using a convergent die 14.

The die 14 is also designed so that the flow over the array of needles 38 is substantially even. An even melt flow around the needles 38 facilitates creation of well-formed extrudate 28. If, however, there is an uneven flow, the melt will preferentially channel along a path of least resistance. This results in a distorted extrudate 28, which can also results in inconsistent draw down distortions.

The process is operated at about 165° C. using linear low-density polyethylene (LLDPE). The motor 6 is controlled using a pressure feedback loop that is set to 300 PSI and this, in turn, causes a pressure of around a few bar in the die 14. Air is entrained as a result of the polymer flow over the array of needles 38 and the feed to this needle 38 array is left open to the atmosphere. The velocity of the polymer melt at the die orifice 36 is of the order of a centimeter a second, the velocity of the haul off device can be set anywhere between zero and 9 meters a minute. It will be understood that the process may be operated as a continuous process.

The parameter that was found to have substantial influence on the final product was the distance L 29, shown in FIG. 1 and defined to be the distance between the die exit and the first roller 30. In fact, in this case the first roller is a stationary polished stainless steel rod submerged in a water bath.

A series of experiments exploring the effect of draw-ratio were carried out, at a fixed volumetric flow of polymer with three different values of L. The values that were used were 150 mm, 80 mm and 8 mm.

Figure 4:
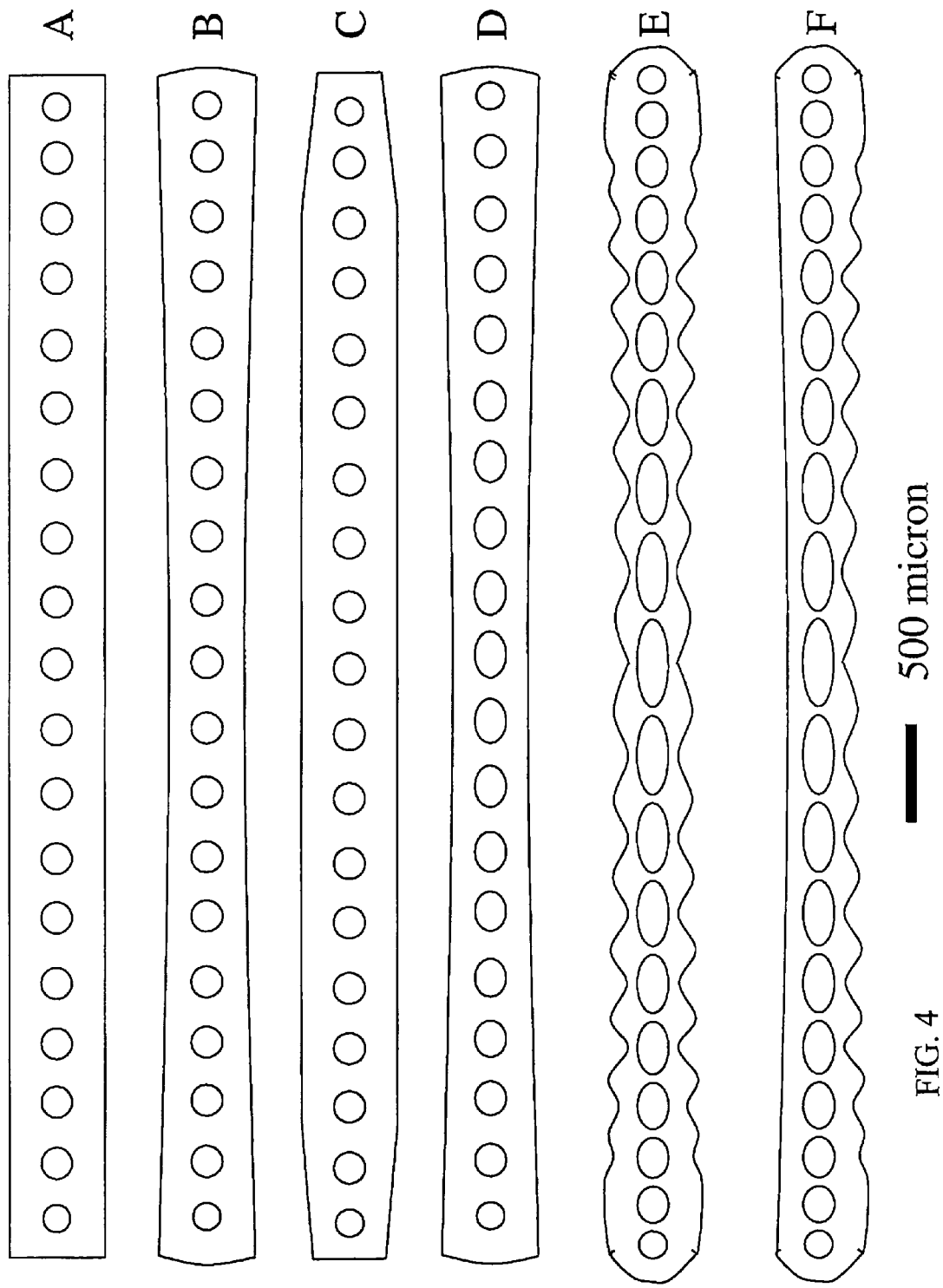
FIG. 4 shows end views of extruded polymer films in accordance with embodiments of the invention.

Surprisingly, it was found that alteration of the melt drawing length, L, alone caused substantial variation in the product shape, form and polymer morphology. Surprisingly a set of conditions could be found which produced highly elongated, thin walled, elliptical capillaries. Non-limiting examples of such extruded polymer film products are illustrated in FIG. 4 (A-E).

The results of the experiments were as follows:

Results for L=150 mm

"Low" draw ratios (8-20)

The external width variation was around 400 micron at maximum and external thickness variation was about 130 micron at maximum.

The external aspect ratio of the product varied between 5 at a draw ratio of 8 up to 5.5 at a draw ratio 20. The product could still be substantially cold drawn which indicated that there was little orientation within the polymer chains.

Apart from the overall reduction in product dimensions, there appeared to be very little variation in the shape and orientation of the capillaries within the product.

"Medium" Draw Ratios (20-50)

There was no substantial difference in the appearance of the product other than reduced dimensions. The width and thickness variation was essentially similar to that encountered with a low draw ratio. The external product aspect ratio varied from 5.5 at a draw ratio of 20 up to around 6 at a draw ratio of 50. There was very little noticeable change in the shape and orientation of the capillaries within the product.

"High" Draw Ratios (50-80)

As for medium draw ratios, there was very little change apart from a reduction in dimensions. At a draw ratio of 55, the external aspect ratio was around 6 and at a draw ratio of 80 the external aspect ratio was around 6.5.

Results for L=80 mm

"Low" draw ratios (4-20)

The external width and thickness variation was noticeably smaller than the variations observed with the drawing length set to 150 mm. The variation in width was around 200 micron at a draw ratio of 4 and about 60 micron at a draw ratio of 20. Similarly, the variation in the thickness was much reduced, being around 20 micron to 30 micron for all draw ratios.

The reduction in both thickness and width followed a similar trend to that when the drawing length was 150 mm, but the absolute value of the external aspect ratio was higher (around 5.5 at a draw ratio of 5 and about 5.8 at a draw ratio of 20).

It was noticed that, at a draw ratio of 4, the product could still be substantially cold drawn. As the draw ratio increased towards 20, however, the ability of the product to cold draw diminished and also the feel of the product was stiffer. Both of these factors point towards an increasing amount of crystallisation within the product.

"Medium" Draw Ratios (20+)

An increase in the draw ratio above 20 resulted in the manifestation of a drawing instability known as draw resonance. The width and the thickness of the product started to vary in a periodic manner.

Results for L=8 mm

"Low" and "Medium" draw ratios (8-45)

The initial external aspect ratio of the product was again higher than in both previous experiments, with an initial external aspect ratio of around 9 at a draw ratio of 7 increasing to around 10.3 at a draw ratio of 45. The variation in the thickness and the width of the product was very little—initially about 80 micron in width at a draw ratio of 7 down to under 10 micron in width at a draw ratio of 45 with similarly small variations in the thickness. The thickness and the width of the product both diminished with increasing draw ratio.

The feel of the product was very "stiff" and exhibited a small capability to be cold drawn at a draw ratio of 7 to having no cold-drawing capability above a draw ratio of around 20. Both these factors point towards a strain-hardened product resulting from increased crystallisation.

The initial form of the capillaries was more elliptical than in previous experiments, with a trend of an increase in the aspect ratio of the ellipse (defined as the ratio of the lengths of the major axis to the minor axis), with the major axis running along the width of the product.

"High" Draw Ratios (45+)

As the draw ratio increased above 45, the width of the product started to unexpectedly increase. This was accompanied by a continued diminution in the thickness of the product. As a direct result, there was a change in the rate of increase of external product aspect ratio and also in the shape and form of the capillaries. It was found that the central holes within the product become highly elongated with elliptical aspect ratios up to around 15, but that the peripheral holes change very little.

The variation in the width and thickness of the product was still only around 10 micron or less, with the product exhibiting all the features of increased crystallinity.

Figure 5A:
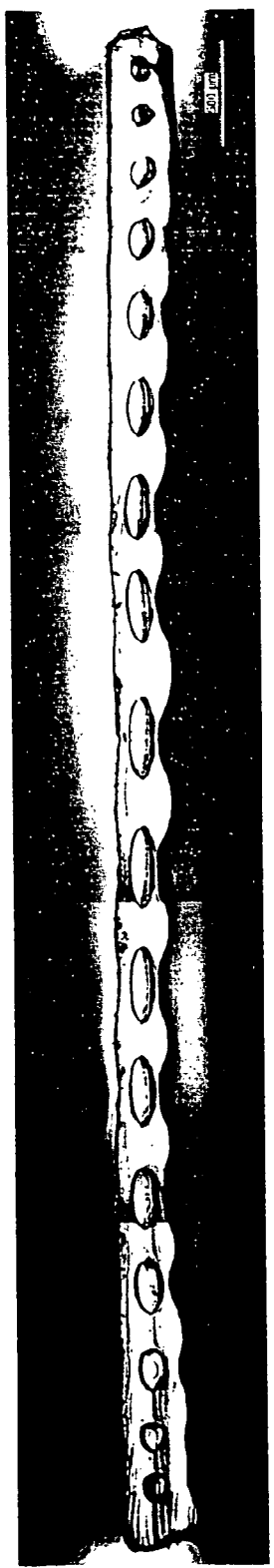
FIG. 5 shows photomicrographs of extruded polymer films in accordance with embodiments of the invention.
Figure 5B:
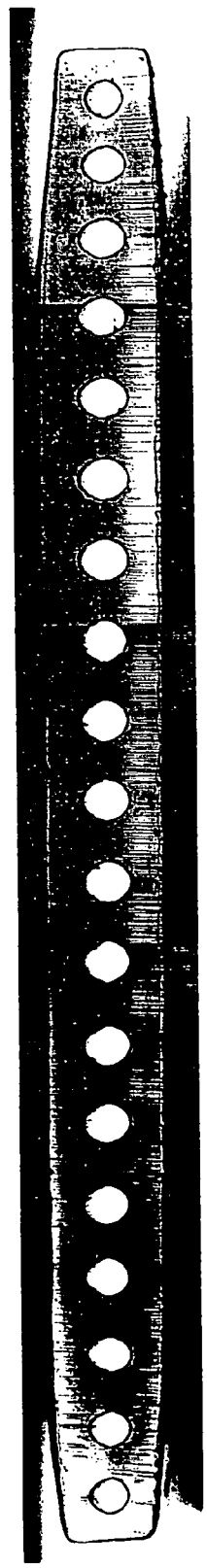
Figure 5C:

Referring now to FIG. 5, photomicrographs are shown of three exemplary extruded polymer film products. The processes for their production are summarised below.

Top photograph (FIG. 5a)
Material: Linear Low Density Polyethylene (LLDPE)
Melt temperature: Approx 160° C.
Die configuration: 17 needles 300 micron internal diameter, die outlet approx 20 mm×1.5 mm
Volumetric polymer flow: Approx $1\times10^{-7}$ m$^3$/s
Quench distance: Approx 9 mm
Draw ratio*: Approx 20

*Draw ratio is the ratio of the velocity of the product when it has been quenched to the velocity that the material exits the die and is hence a measure of how much it has been 'stretched' in the drawing direction Middle photograph (FIG. 5b)
Material: Linear Low Density Polyethylene (LLDPE)
Melt temperature: Approx 160° C.
Die configuration: 19 needles 400 micron internal diameter, die outlet approx 20 mm×1.5 mm
Volumetric polymer flow: Approx $1\times10^{-7}$ m$^3$/s
Quench distance: Approx 25 mm
Draw ratio*: Approx 10

Bottom photograph (FIG. 5c)
Material: Linear Low Density Polyethylene (LLDPE)
Melt temperature: Approx 160° C.
Die configuration: 17 needles 300 micron internal diameter, die outlet approx 20 mm×1.5 mm
Volumetric polymer flow: Approx $1\times10^{-7}$ m$^3$/s
Quench distance: Approx 9 mm
Draw ratio*: Approx 9.

The invention claimed is:

1. A method for producing an extrudate product including a plurality of capillary channels therealong from a molten extrudable material, the method comprising the steps of:

a) providing an extrusion apparatus comprising an extruder configured for extruding an extrudate from a molten extrudable material, said extruder having an inlet, a die including an entry portion, a convergent portion and an orifice located at an exit of the die, the orifice having a predetermined outer shape and cross-section, a plurality of needles each needle having a body including an internal first conduit for fluid flow, each needle further comprising an outlet from the internal first conduit at an outlet end, the outlet end of each needle of said plurality of needles being arranged in a predetermined pattern, wherein the outlet end of each needle is arranged such that the outlet end of each needed is located within the orifice of the die, the internal first conduit of each needle being fluidly connected to a fluid source by a second conduit passing through an exterior wall of said die and around which a molten extrudable material flows to pass to said orifice of said die;

b) feeding said molten extrudable material into the extruder through the inlet;

c) using the extruder to force the molten extrudable material to flow towards the die, over and around the plurality of needles and corresponding second conduit and fluidly connecting each needle to a fluid source, and through the orifice in the die to produce an extrudate initially generally having the predetermined outer shape and cross-section of the orifice located at the exit of the die;

d) allowing a fluid medium to flow from the fluid source through the second conduit to the internal first conduit and needle outlet of each of said plurality of needles, whereby the fluid medium forms capillaries such that the extrudate includes capillaries therealong in the same predetermined pattern as the plurality of needles, wherein said needle outlet of each of the plurality of needles has a diameter of 2 mm or less, and wherein said diameter of said capillaries in said extrudate is directly related to the diameter of the needle outlets of each of said plurality of needles; and e) using a draw down apparatus to draw down the extrudate thereby altering the initial predetermined outer shape and cross-section of the extrudate to form an extrudate product having a finished predetermined outer shape and cross-section which is different from said initial predetermined outer shape and cross-section.

2. A method as claimed in claim 1, in which the draw down apparatus includes a plurality of rollers to draw down the extrudate.

3. A method of making a laminated extruded product comprising forming first and second extrudate film products, wherein each first and second extrudate film product is formed according to the method of claim 1, and laminating said extrudate film products together.

4. A method as claimed in claim 3, in which the two or more films are laminated together using heat and pressure.

5. The method as claimed in claim 1, in which the fluid medium is air at atmospheric pressure, and wherein the flow of the molten extrudable material towards the die, over and around the plurality of needles in the die entrains said air through said internal conduit of each of said plurality of needles thereby forming said capillaries in the extrudate product.

6. The method as claimed in claim 1, in which the fluid medium is provided at atmospheric pressure.

7. The method as claimed in claim 1, in which the fluid medium is provided at a pressure above or below atmospheric pressure.

8. The method as claimed in claim 1, in which the fluid medium is selected from the group consisting of air, liquid and an inert gas.

9. The method as claimed in claim 1, wherein the capillaries in the extrudate product have a maximum bore size of less than 500 microns.

10. The method as claimed in claim 1, wherein the capillaries in the extrudate product have a maximum bore size in the range 20 microns to 200 microns.

11. The method as claimed in claim 2, in which the method includes the additional step of a further processing stage, wherein the capillaries in the extrudate product have a bore size below 1 micron.

12. A method for producing an extrudate product including a plurality of capillary channels therealong from a molten extrudable material, the method comprising the steps of:

a) providing an extrusion apparatus comprising an extruder configured for extruding an extrudate from a molten extrudable material, said extruder having an inlet, a die including an entry portion, a convergent portion and an orifice located at an exit of the die, the orifice having a predetermined outer shape and cross-section, a plurality of needles each needle having a body including an internal first conduit for fluid flow, each needle further comprising an outlet from the internal first conduit at an outlet end, the outlet end of each needle of said plurality of needles being arranged in a predetermined pattern, wherein the outlet end of each needle is arranged such that the outlet end of each needed is located within the orifice of the die, the internal first conduit of each needle being fluidly connected to a fluid source by a second conduit passing through an exterior wall of said die and around which a molten extrudable material flows to pass to said orifice of said die;

b) feeding said molten extrudable material into the extruder through the inlet;

c) using the extruder to force the molten extrudable material to flow towards the die, over and around the plurality of needles and corresponding second conduit and fluidly connecting each needle to a fluid source, and through the orifice in the die to produce an extrudate having the predetermined outer shape and cross-section;

d) allowing a fluid medium to flow from the fluid source through the second conduit to the internal first conduit and needle outlet of each of said plurality of needles, said fluid medium comprising air/inert gas at atmospheric pressure, whereby the fluid medium forms capillaries such that the extrudate includes capillaries therealong in the same predetermined pattern as the plurality of needles, wherein said needle outlet of each of the plurality of needles has a diameter of 2 mm or less, and wherein said diameter of capillaries in said extrudate is directly related to the diameter of the needle outlets of each of said plurality of needles.

13. A method for producing an extrudate product including a plurality of capillary channels therealong, the method comprising the steps of:

a) providing an extrusion apparatus comprising a screw extruder having an inlet, a die including an entry portion, a convergent portion and an orifice located at an exit of the die, the orifice having a predetermined outer shape and cross-section, a plurality of needles each needle having a body including an internal first conduit for fluid flow, each needle further comprising an outlet from the internal first conduit at an outlet end, the outlet end of each needle of said plurality of needles being arranged in a predetermined pattern, wherein the outlet end of each needle is arranged such that the outlet end of each needed is located within the orifice of the die, the internal first conduit of each needle being fluidly connected to a fluid source by a second conduit passing through an exterior wall of said die and around which an extrudable material flows to pass to said orifice of said die;

b) feeding said extrudable material into the screw extruder through the inlet;
c) using the screw extruder to force the extrudable material to flow towards the die, over and around the plurality of needles and corresponding second conduit and fluidly connecting each needle to a fluid source, and through the orifice in the die to produce an extrudate having the predetermined outer shape and cross-section;
d) allowing a fluid medium to flow from the fluid source through the second conduit to the internal first conduit and needle outlet of each of said plurality of needles, said fluid medium comprising air/inert gas at atmospheric pressure, whereby the fluid medium forms capillaries such that the extrudate includes capillaries therealong in the same predetermined pattern as the plurality of needles, wherein said needle outlet of each of the plurality of needles has a diameter of 2 mm or less, and wherein said diameter of said capillaries in said extrudate is directly related to the diameter of the needle outlets of each of said plurality of needles.

\* \* \* \* \*